Patented Aug. 4, 1931

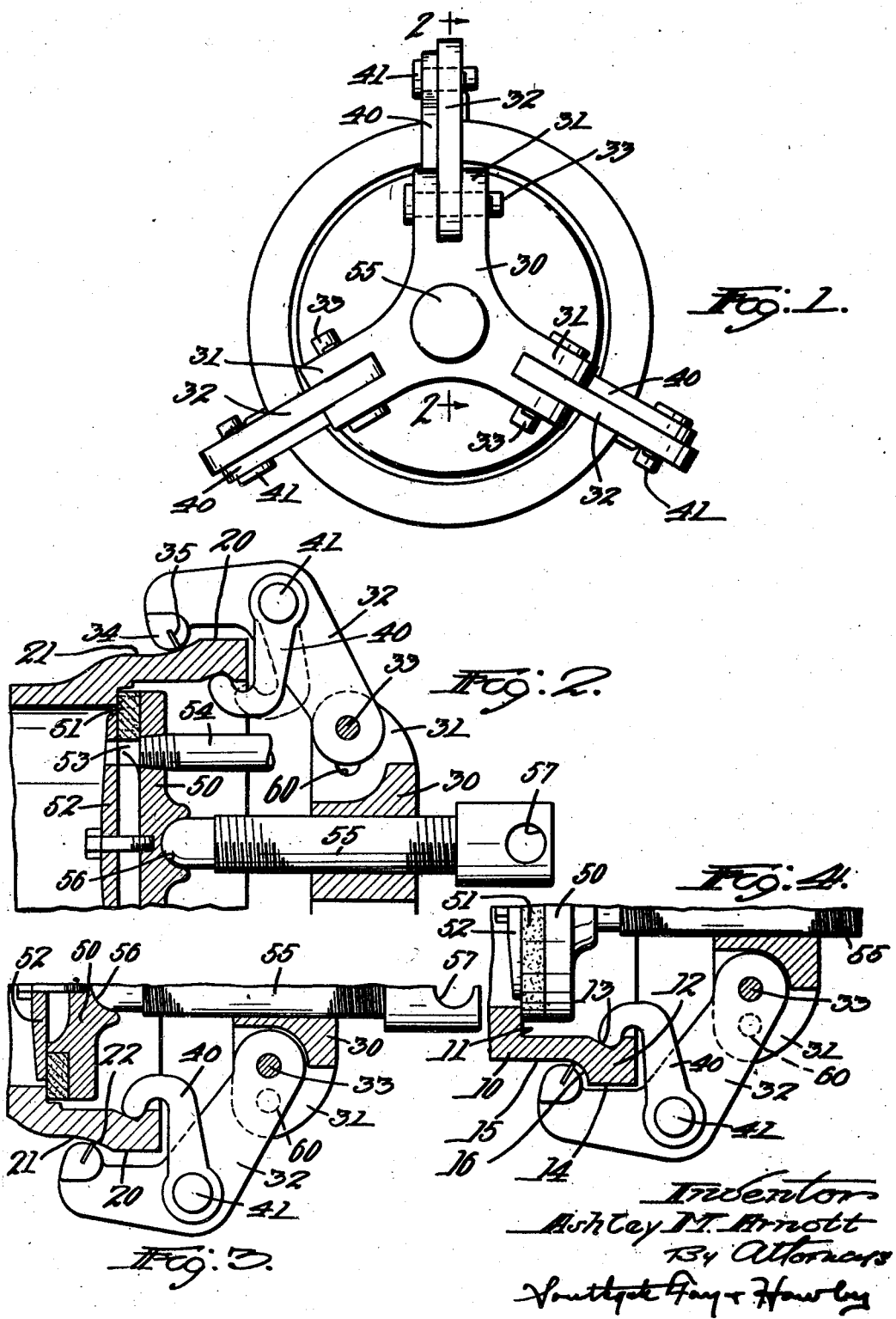

1,817,796

UNITED STATES PATENT OFFICE

ASHLEY M. ARNOTT, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS

PIPE CLOSING DEVICE

Application filed December 18, 1929. Serial No. 415,010.

This invention relates to a device for temporarily closing the ends of large pipes and for holding the same closed against hydraulic or other pressure. During the construction or repair of systems of heavy piping for hydraulic or similar purposes, it is frequently necessary to temporarily close an open end of a pipe line, so that pressure may be applied to the portion of the system already available for use. Other similar occasions frequently arise in which it is desirable to temporarily close the end of a large pipe.

It is the object of my invention to provide an improved pipe closing device, so designed that it may be readily applied to pipes of different diameters and having different wall sections, and so applied that it will firmly resist any internal pressure which may reasonably be applied thereto.

A preferred form of the invention is shown in the drawings in which

Fig. 1 is an end view of my improved pipe closing device;

Fig. 2 is a partial sectional side elevation, taken along the line 2—2 in Fig. 1.

Fig. 3 is a view similar to Fig. 2 but showing the device applied to a pipe of a different diameter, and Fig. 4 is a view similar to Fig. 2 but showing the device applied to a pipe having a different wall section.

Referring to the drawings, my improved pipe closing device is particularly designed for application to large pipes formed by casting in sand or in a centrifugal casting apparatus. A typical section of a sand cast pipe is indicated in Fig. 4, the pipe 10 having an inner shoulder or seat 11 and a bell portion 12 having an angular groove 13 in its inner face and having an outwardly enlarged portion 14, joined to the outer surface 15 of the bell by a substantially quarter-circular fillet 16.

In Figs. 2 and 3, I have shown a usual section of centrifugal or spun cast pipe, in which the outward projection 20 is less pronounced and in which the projection 20 is joined to the outer wall portion 21 of the bell by a slightly tapered surface 22. The pipes shown in Figs. 3 and 4 corresponds in proportions to a six inch pipe, while the pipe shown in Fig. 2 corresponds in proportions to an eight inch pipe.

It is obviously more difficult to close the end of a centrifugal cast pipe (as shown in Figs. 2 or 3) than it is to close the end of a sand cast pipe, as shown in Fig. 4, because the quarter round fillet 16 of the sand cast pipe affords a much better hold for the clamps of the closing device than the slightly tapered surface 22 of the centrifugal cast pipe.

In fact, much difficulty has been encountered in securing a closing device to the slightly tapered bell of the centrifugal pipe.

My improved pipe closing device is applicable, however, to either form of pipe, and comprises a frame member 30 having spaced radial bearing portions 31, in which clamping arms 32 are pivoted on studs 33. The arms 32 are displaced outwardly in their middle portions to clear the end of the pipe when in clamping position, and are provided with inwardly offset projections 34 which are preferably slotted to receive steel blades 35. The blades 35 are sharpened and tempered and are well adapted to bite firmly into the smooth and hard outer surface of the cast pipe.

A dog 40 is pivoted at 41 to each clamping arm 32 and has a hook-shaped end adapted to be received and seated in the angular groove 13 on the inside of the end portion or bell of the pipe.

A pipe closing disc 50 is provided with a packing ring or gasket 51 held in place by a clamping plate 52. The closing plate 50 may also have an opening 53 therethrough and may have a pipe 54 connected thereto, through which the pressure within the pipe line may be increased or diminished.

A clamping screw 55 is threaded in the center of the frame 30 and the rounded inner end thereof engages a socket 56 in the center of the plate 50. The screw 55 is provided with a transverse opening 57 in which a rod or other actuating member may be inserted.

The bearing portions 31 of the frame 30 are provided with two or more openings 60 for the pivot pins 33 and the parts may be readily adapted to pipes of different diameters by moving the pivot pins to different openings 60.

In Figs. 2 and 3, two such openings are shown. In Fig. 2 the pins 33 are in the outer openings 60 for an eight inch pipe, while in Fig. 3 they are in the inner openings for a six inch pipe.

In using my improved pipe closing device, the plate 50 is inserted in the end of the pipe and the frame 30 is then moved in position, with the end of the screw 55 seated in the socket 56 and with the arms 32 engaging the outer surface of the pipe end or bell. The dogs 40 are then swung into engagement with the inner surface of the pipe end or bell and pressure is applied by means of the screw 55.

The pivot pins 33 then receive a straight line outward movement, which causes the engaging ends of the arms 32 and dogs 40 to grip the outer and inner surfaces of the pipe bell with increasing pressure as the frame 30 is moved outward. The stronger the pressure, the more firmly the device is gripped to the end of the pipe and the more securely the plate 50 is seated against the shoulder 11 in the end of the pipe.

This result obtains from the fact that as the pivots 33 are moved axially away from the end of the pipe, the ends 34 of the arms 32 must move either axially or outward away from the pipe if any movement of these ends takes place. Obviously, the enlarged end portion 14 (Fig. 4) or 20 (Fig. 2) of the pipe makes direct axial movement impossible. The arms 32 might swing outward if it were not for the dogs 40 but these dogs engage the side of the pipe portions 14 or 20 and prevent any outward movement of the ends 34 of the arms 32. As no other movement is possible, the arms 32 cannot follow the attempted movement of the pivots 33 but remain fixed in position, thus anchoring the frame 30 and providing a base against which the screw 55 may re-act in applying pressure to the closure 50.

When the device is applied to a sand cast pipe, the parts engage in the same manner as previously described and readily adjust themselves to the differences in wall section, as well as to differences in pipe diameter.

Having thus described my invention and the advantages thereof, I do not wish to be limited to the details herein disclosed, otherwise than as set forth in the claims, but what I claim is:—

1. A pipe closing device comprising a frame, a plurality of clamping arms pivoted in spaced relation on said frame and engaging an outer surface of said pipe, dogs pivoted to said arms and engaging an inner surface of said pipe, a closure for said pipe, and means on said frame for seating said closure against an end surface of said pipe.

2. A pipe closing device comprising a frame, a plurality of clamping arms pivoted in spaced relation on said frame and each having an offset portion engaging an outer surface of said pipe, dogs pivoted on said arms and each having a hook portion engaging an inner surface of said pipe, a closure for said pipe, and means to press said closure against an end surface of said pipe and to move said arms and dogs to apply clamping pressure to the portion of pipe interposed between said parts.

3. The combination in a pipe closing device as set forth in claim 2, in which the pivotal connection of the clamping arms to the frame is substantially nearer the center of the frame and pipe than the pipe surface engaged by said arms and in which the pivotal connection of said dogs to said clamping arms is substantially further from the center of said frame and pipe than the pipe surface engaged thereby.

4. A closing device for a pipe having a bell with an outwardly enlarged portion and with a groove in its inner side wall, said device comprising a plurality of clamping arms pivoted in spaced relation on said frame and each having an offset portion engaging the outwardly enlarged portion of said pipe bell, dogs pivoted on said arms and each having a portion engaging the groove in said bell, a closure for said pipe, and means to press said closure against an end surface of said pipe and to move said arms and dogs to apply clamping pressure to the portion of the pipe bell interposed between said parts.

In testimony whereof I have hereunto affixed my signature.

ASHLEY M. ARNOTT.